United States Patent
Hagita et al.

(10) Patent No.: US 12,206,284 B2
(45) Date of Patent: Jan. 21, 2025

(54) ELECTRIC COMPRESSOR

(71) Applicant: MITSUBISHI HEAVY INDUSTRIES THERMAL SYSTEMS, LTD., Tokyo (JP)

(72) Inventors: Takayuki Hagita, Tokyo (JP); Hideo Saho, Tokyo (JP); Shohei Terasaki, Tokyo (JP); Yasunori Watanabe, Tokyo (JP); Shunsuke Yakushiji, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 424 days.

(21) Appl. No.: 17/436,332

(22) PCT Filed: Jan. 15, 2020

(86) PCT No.: PCT/JP2020/001004
§ 371 (c)(1),
(2) Date: Sep. 3, 2021

(87) PCT Pub. No.: WO2020/183896
PCT Pub. Date: Sep. 17, 2020

(65) Prior Publication Data
US 2022/0173626 A1    Jun. 2, 2022

(30) Foreign Application Priority Data
Mar. 8, 2019 (JP) .................. 2019-042731

(51) Int. Cl.
*H02K 1/18* (2006.01)
*B60H 1/32* (2006.01)
*F25B 31/02* (2006.01)

(52) U.S. Cl.
CPC .......... *H02K 1/185* (2013.01); *F25B 31/026* (2013.01); *B60H 1/3222* (2013.01)

(58) Field of Classification Search
CPC   H02K 1/18; H02K 1/185; H02K 1/06; H02K 1/146; H02K 1/16; H02K 5/04;
(Continued)

(56) References Cited

U.S. PATENT DOCUMENTS 3,874,073 A * 4/1975 Dochterman .......... H02K 15/12
                                                           310/43
3,953,275 A * 4/1976 Henderson ............. H02K 15/12
                                                           156/563
(Continued)

FOREIGN PATENT DOCUMENTS

JP         61-195734 U     12/1986
JP          7-31086 A       1/1995
(Continued)

OTHER PUBLICATIONS

JP 2015076953 A_Translation (Year: 2023).*
(Continued)

*Primary Examiner* — Christopher M Koehler
*Assistant Examiner* — Ahmed F Seck
(74) *Attorney, Agent, or Firm* — BIRCH, STEWART, KOLASCH & BIRCH, LLP

(57) ABSTRACT

A stator of an electric compressor has a stator core configured by laminating a plurality of electromagnetic steel plates in an axial direction, the electromagnetic steel plates having a substantial ring shape as seen from the axial direction. As seen from the axial direction, a plurality of through-holes are formed through the stator core in the lamination direction of the electromagnetic steel plates, on the same circle centered around the axis line, and as seen from the axial direction, a first arc length or a second arc length longer than the first arc
(Continued)

length is set as each arc length between through-holes adjacent in the circumferential direction. The stator is secured to a housing by a bolt inserted through the through-holes, the stator core is varnished at least in areas near the centers in the circumferential direction between through-holes where the second arc length is set.

6 Claims, 2 Drawing Sheets

(58) Field of Classification Search
CPC ........ H02K 15/02; H02K 15/03; H02K 15/10; H02K 15/12; H02K 15/125; B60H 1/3222; F25B 31/026
USPC ..................................................... 310/34, 45
See application file for complete search history.

(56) References Cited

U.S. PATENT DOCUMENTS

| | | | | |
|---|---|---|---|---|
| 4,085,347 A | * | 4/1978 | Lichius | H02K 1/16 |
| | | | | 174/DIG. 20 |
| 4,155,020 A | * | 5/1979 | Skare | F16B 21/06 |
| | | | | 310/258 |
| 4,503,604 A | * | 3/1985 | Rediger | 310/45 |
| 2001/0036414 A1 | | 11/2001 | Makino et al. | |
| 2009/0072655 A1 | * | 3/2009 | Sano | H02K 1/16 |
| | | | | 310/217 |
| 2009/0123308 A1 | | 5/2009 | Taniwa et al. | |
| 2021/0226515 A1 | * | 7/2021 | Nishikawa | H01F 1/153 |
| 2023/0392589 A1 | * | 12/2023 | Tanaka | F04B 35/04 |

FOREIGN PATENT DOCUMENTS

| | | | | |
|---|---|---|---|---|
| JP | 2001-280249 A | | 10/2001 | |
| JP | 2007-255332 A1 | | 10/2007 | |
| JP | 2015076953 A | * | 4/2015 | ............. F04C 23/02 |
| JP | 2017-36691 A | | 2/2017 | |
| JP | 2017-82684 A | | 5/2017 | |
| JP | 2017-200356 A | | 11/2017 | |
| WO | WO 2016063576 A1 | * | 4/2016 | ............... H02K 1/18 |

OTHER PUBLICATIONS

WO 2016063576 A1_Translation (Year: 2023).*
International Search Report issued Mar. 10, 2020 in International Patent Application No. PCT/JP2020/001004 with English Translation.
Written Opinion issued Mar. 10, 2020 in International Patent Application No. PCT/JP2020/001004 with English Translation.

* cited by examiner

ELECTRIC COMPRESSOR

TECHNICAL FIELD

The present disclosure relates to an electric compressor.

BACKGROUND ART

In an electric motor housed in a housing of an electric compressor, a method for fixing a stator to the housing by shrink fitting is known (refer to PTL 1).

CITATION LIST

Patent Literature

[PTL 1] Japanese Unexamined Patent Application Publication No. 2017-82684

SUMMARY OF INVENTION

Technical Problem

However, there is a possibility that fixing the stator by shrink fitting as disclosed in PTL 1 may contribute to an increase in work steps or an increase in work time. In order to solve this problem, there is a method for fixing the stator to the housing with a bolt (bolting down), as a fixing method that does not rely on shrink fitting.

In the electric compressor in which the stator is fixed to the housing by bolting down, it is necessary to form a through-hole for the bolt in the stator. In this case, it is preferable that a large number of through-holes are formed at an equal angular interval in a circumferential direction of the stator. The reason is as follows. Since a large number of bolts are evenly disposed in the circumferential direction, rigidity can be improved by increasing adhesion between laminated steel sheets forming the stator.

However, when the large number of through-holes are formed in the stator, a magnetic force line may be blocked more than necessary by the through-holes, or the number of components and the number of times for processing may increase. Therefore, it is desirable to reduce the number of the through-holes for bolts as much as possible. However, the adhesion between the laminated steel sheets forming the stator decreases, thereby possibly causing the rigidity to decrease.

The present disclosure is made in view of the above-described circumstances, and an object thereof is to provide an electric compressor which can reduce a probability that a magnetic force line may be blocked more than necessary by a through-hole for a bolt or that the number of components and the number of times for processing may increase, and which can ensure rigidity by increasing adhesion between laminated steel sheets.

Solution to Problem

In order to solve the above-described problems, an electric compressor according to the present disclosure adopts following means.

That is, according to one aspect of the present disclosure, there is provided an electric compressor including an electric motor having a stator and a rotor, a drive shaft fixed to the rotor, and rotating around an axis by the electric motor, a compression mechanism provided on one end side of the drive shaft, and driven by the drive shaft, and a housing that houses the electric motor, the drive shaft, and the compression mechanism. The stator has a stator core formed such that a plurality of electromagnetic steel sheets having a substantially annular shape are laminated in a direction of the axis when viewed in the direction of the axis. When viewed in the direction of the axis, in the stator core, a plurality of through-holes penetrating in a lamination direction of the electromagnetic steel sheets are formed on the same circle around the axis. When viewed in the direction of the axis, as an arc length between the through-holes adjacent to each other in a circumferential direction, a first arc length or a second arc length longer than the first arc length is set. The stator is fixed to the housing by a bolt inserted into the through-hole. The stator core is subjected to varnish treatment in at least a region near a center in the circumferential direction between the through-holes through which the second arc length is set.

According to the electric compressor in this aspect, the stator has the stator core configured such that the plurality of electromagnetic steel sheets having the substantially annular shape when viewed in the direction of the axis are laminated in the direction of the axis. When viewed in the direction of the axis, in the stator core, the plurality of through-holes penetrating in the lamination direction of the electromagnetic steel sheets are formed on the same circle around the axis. As the arc length between the through-holes adjacent to each other in the circumferential direction when viewed in the direction of the axis, the first arc length or the second arc length longer than the first arc length is set. The stator is fixed to the housing by the bolt inserted into the through-hole. In this manner, for example, the number of through-holes can be reduced, compared to a case where the plurality of through-holes are formed by setting a distance between all of the through-holes as the first arc length.

In addition, the stator core is subjected to the varnish treatment in at least the region near the center in the circumferential direction between the through-holes where the second arc length is set. In this manner, rigidity can be ensured by increasing adhesion between the electromagnetic steel sheets laminated in the region.

In the electric compressor in which the stator is fixed to the housing by bolting down, it is necessary to form a through-hole for a bolt in the stator core. In this case, when the stator core is viewed in the direction of the axis, it is preferable that the plurality of through-holes are formed at an equal angular interval in the circumferential direction. The reason is as follows. Since a large number of bolts are evenly disposed, the rigidity can be improved by increasing the adhesion between the laminated electromagnetic steel sheets. However, when the large number of through-holes are formed in the stator core, a magnetic force line may be blocked more than necessary by the through-holes, or the number of components and the number of times for processing may increase.

Therefore, the number of through-holes are deliberately reduced as in the above-described electric compressor. In this manner, it is possible to reduce a probability that the magnetic force line may be blocked more than necessary by the through-holes or that the number of components and the number of times for processing may increase. At the same time, the varnish treatment is performed on the stator core near at least the region where the number of through-holes is reduced (center of the second arc length in the circumferential direction). In this manner, the rigidity can be ensured without using the bolt by increasing the adhesion between the electromagnetic steel sheets laminated in the region. In addition, since the rigidity is ensured, noise caused by vibrations of the stator core can be suppressed.

In addition, in the electric compressor according to an aspect of the present disclosure, when viewed in the direction of the axis, the stator core may have a yoke portion having a substantially annular shape, and a plurality of bridge portions extending inward in a radial direction from an inner peripheral end of the yoke portion, and formed in each of the first arc lengths in the circumferential direction.

According to the electric compressor in this aspect, the stator core has the yoke portion having the substantially annular shape when viewed in the direction of the axis, and the plurality of bridge portions extending inward in the radial direction from the inner peripheral end of the yoke portion, and formed in each of the first arc lengths in the circumferential direction.

According to this aspect, the number of through-holes (that is, the number of bolts) is smaller than the number of bridge portions.

In addition, in the electric compressor according to an aspect of the present disclosure, the through-hole may be formed in the yoke portion located on a base end side of the bridge portion. A cutout may be formed on an outer periphery of the yoke portion between the through-holes through which the second arc length is set.

According to the electric compressor in this aspect, the through-hole is formed in the yoke portion located on the base end side of the bridge portion, and the cutout is formed on the outer periphery of the yoke portion between the through-holes where the second arc length is set. According to this aspect, a refrigerant flow path can be formed by utilizing the region subjected to the varnish treatment.

In the electric compressor which is preferably miniaturized, the cutout may be formed in the stator core to form the refrigerant flow path inside the housing. However, the cutout is formed in a region where the rigidity is improved through the varnish treatment. In this manner, a decrease in the rigidity of the whole stator core can be suppressed as much as possible while the cutout is formed.

In addition, in the electric compressor according to an aspect of the present disclosure, the first arc length and the second arc length may be alternately set in the circumferential direction.

According to the electric compressor in this aspect, the first arc length and the second arc length are alternately set in the circumferential direction. According to this aspect, the stator can be evenly fixed to the housing by bolting down.

Advantageous Effects of Invention

According to the electric compressor in this aspect, it is possible to reduce a probability that a magnetic force line may be blocked more than necessary by the through-hole for the bolt, or that the number of components and the number of times for processing may increase, and the rigidity can be ensured by increasing the adhesion between the laminated steel sheets.

DESCRIPTION OF EMBODIMENTS

Hereinafter, an electric compressor according to an embodiment of the present disclosure will be described with reference to the drawings.

First, an electric compressor 1 will be briefly described.

Figure 1:
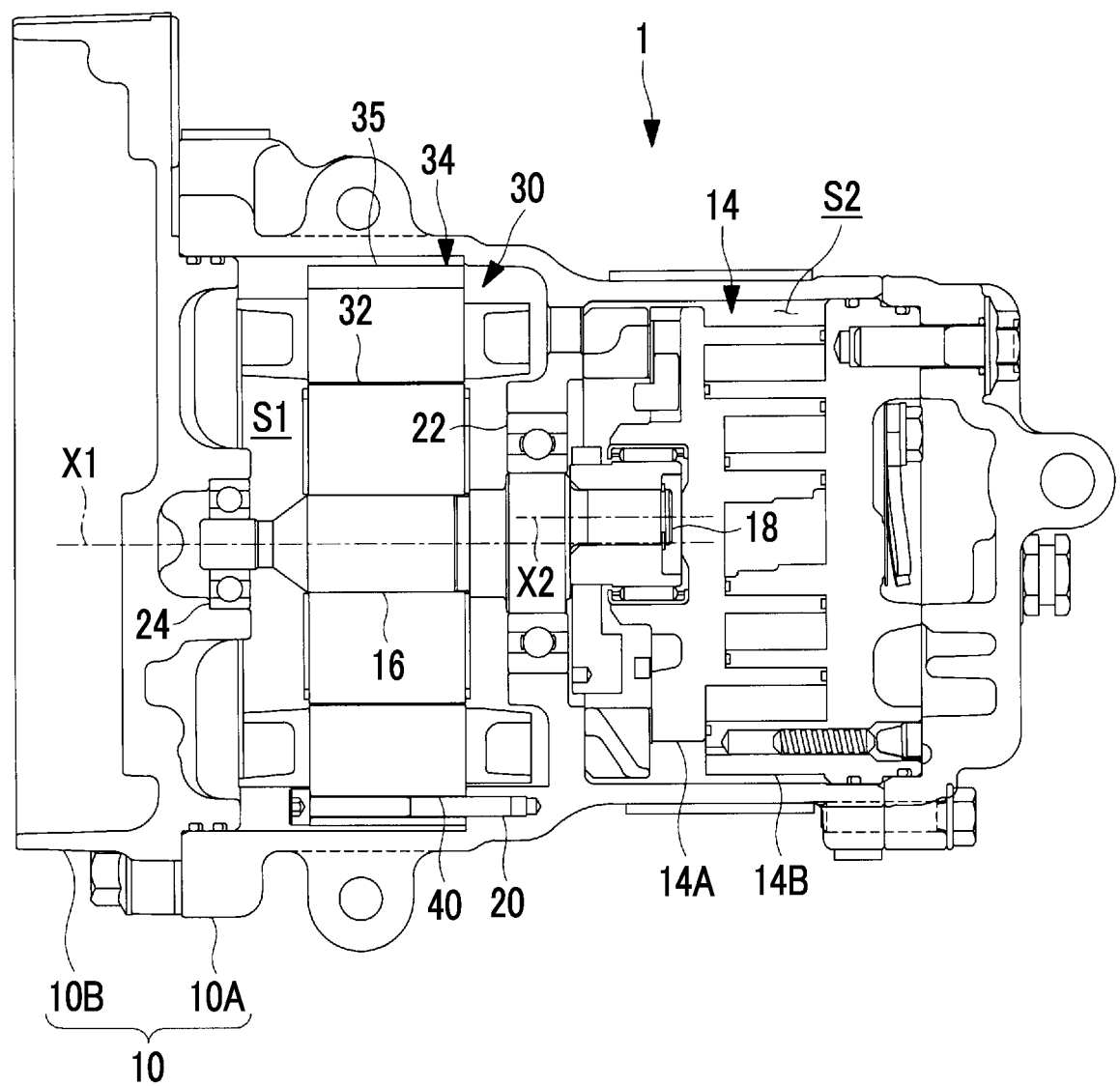
FIG. 1 is a longitudinal sectional view of an electric compressor according to an embodiment of the present disclosure.

The electric compressor 1 is provided in an air conditioner installed in a vehicle such as an electric vehicle and a hybrid vehicle, and compresses a refrigerant suctioned from an evaporator side so that the compressed refrigerant is discharged to a condenser side. As illustrated in FIG. 1, the electric compressor 1 includes a housing 10, an electric motor 30 housed in the housing 10, and a scroll compression mechanism 14.

The housing 10 includes a housing body 10A having a cylindrical shape and a front case 10B fitted to close an opening end of the housing body 10A.

The front case 10B illustrated in FIG. 1 has a form in which an inverter case for housing an inverter device (not illustrated) is integrally formed. However, without being limited to this form, for example, the inverter case may not be integrally formed.

The housing 10 internally has an electric motor housing space S1 and a compression mechanism housing space S2.

The housing 10 is provided with a suction port and a discharge port (not illustrated).

The electric motor 30 includes a stator 34 having a substantially annular shape and a rotor 32 disposed inside the stator 34, and is housed in the electric motor housing space S1.

The stator 34 has a stator core 35 in which a plurality of electromagnetic steel sheets are laminated, and a coil wound around the stator core 35. Details of the stator core 35 will be described later.

A through-hole 40 is formed in the stator core 35, and the stator 34 is fixed to the housing body 10A by a bolt 20 inserted into the through-hole 40 (bolting down).

Although only one bolt 20 is illustrated in FIG. 1, the actual stator 34 is fixed by a plurality of the bolts 20.

The electric motor 30 is rotated by using three-phase AC power supplied from an inverter device (not illustrated). Specifically, the rotor 32 disposed inside the stator 34 is rotated by the stator 34 whose magnetic poles are switched by supplying a three-phase AC power source. In addition, a drive shaft 16 is fixed to the rotor 32.

The drive shaft 16 is attached to be rotatable around a rotational axis X1 by a main bearing 22 fitted to the housing body 10A and a sub bearing 24 fitted to the front case 10B.

The drive shaft 16 is rotated around the rotational axis X1 by the rotation of the rotor 32. A crank pin 18 is integrally formed with the drive shaft 16 in an end portion of the drive shaft 16. A central axis X2 of the crank pin 18 is eccentric with respect to the rotational axis X1 of the drive shaft 16.

The scroll compression mechanism 14 is housed in the compression mechanism housing space S2, and is driven by the rotated drive shaft 16.

Specifically, the scroll compression mechanism 14 is configured so that an orbiting scroll 14A attached to the crank pin 18 and a fixed scroll 14B fixed to the housing body 10A mesh with each other while mutual phases are shifted by 180°.

When the drive shaft 16 is rotated, an operation of a rotation prevention mechanism (not illustrated) drives the orbiting scroll 14A to revolve and orbit with respect to the fixed scroll 14B, and a pair of compression chambers formed between both the scrolls gradually decreases a volume thereof while moving to a central position from an outer peripheral position.

In this manner, a refrigerant supplied from the outside via the suction port is compressed, and the compressed refrigerant is supplied to the condenser via the discharge port. The air conditioner performs in-vehicle air conditioning by using the refrigerant compressed by the electric compressor 1.

Next, details of the stator core 35 will be described.

Figure 2:
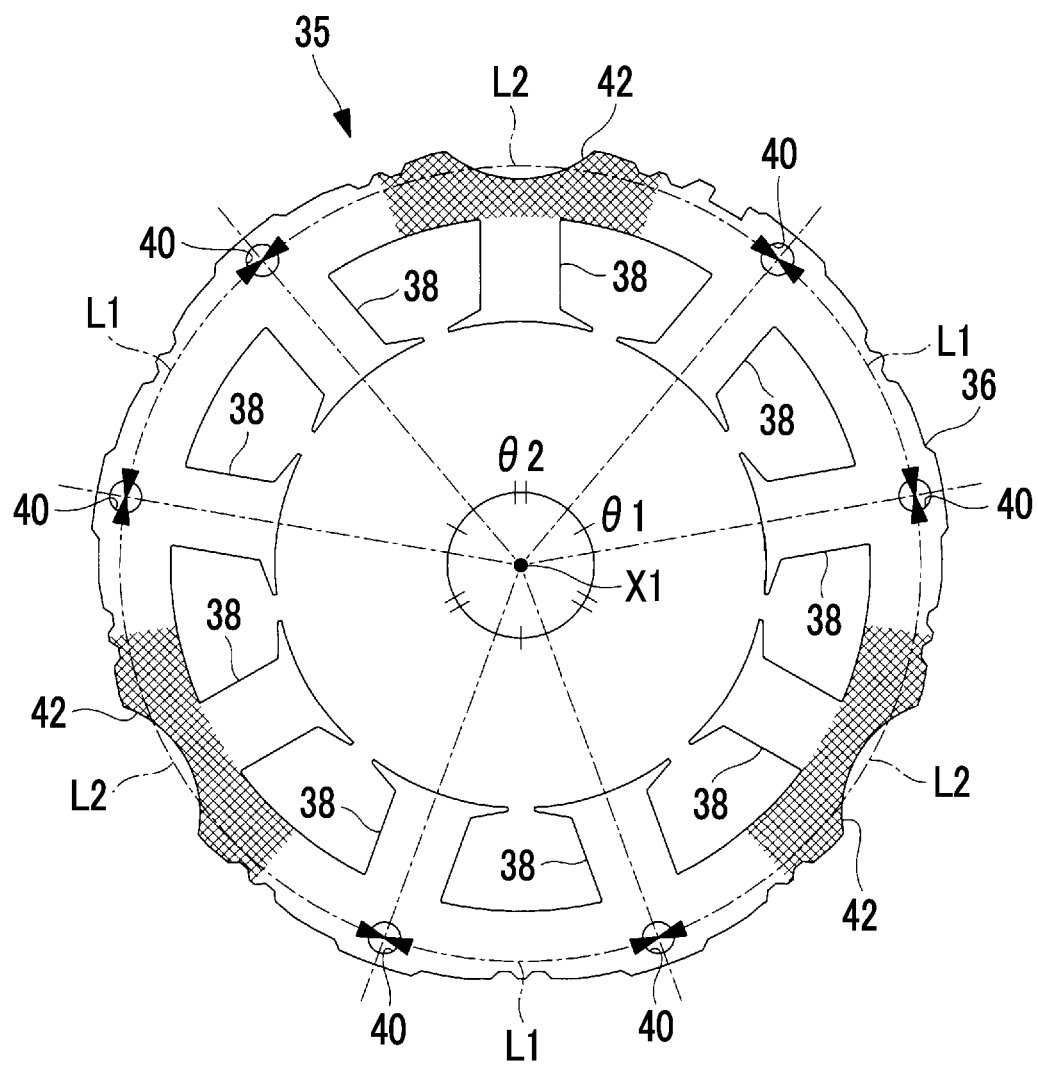
FIG. 2 is a plan view of a stator core (electromagnetic steel sheet).

The stator core 35 is configured such that a plurality of electromagnetic steel sheets are laminated in a predetermined direction (direction of the rotational axis X1 illustrated in FIG. 1), and has a substantially annular shape when viewed in the direction of the rotational axis X1, as illustrated in FIG. 2.

The stator core 35 has a yoke portion 36 having a substantially annular shape and a plurality of bridge portions 38 formed to extend inward in the radial direction from an inner peripheral end of the yoke portion 36.

A tip portion of the bridge portion 38 is widened. A coil (not illustrated) is wound around the bridge portion 38 in a section between the widened tip portion and the yoke portion 36.

A space between the bridge portions 38 adjacent to each other is called a slot. In a case of the stator core 35 illustrated in FIG. 2, nine slots are formed by the nine bridge portions 38.

In this case, the nine bridge portions 38 are formed at an equal angular interval (interval of 40° in a case of FIG. 2) around the rotational axis X1.

The yoke portion 36 has a plurality of through-holes 40 provided on a circle around the rotational axis X1, and penetrating in a lamination direction of the electromagnetic steel sheets. In this case, a predetermined arc length is set in the circumferential direction between the through-holes 40 adjacent to each other. Details of the arc length will be described later.

As illustrated in FIG. 1, the bolt 20 is inserted into the through-hole 40. Then, the inserted bolt 20 is tightened. In this manner, the plurality of laminated electromagnetic steel sheets are brought into close contact, and are integrated with each other in the lamination direction, and the stator 34 is fixed to the housing body 10A.

As illustrated in FIG. 2, the number of through-holes is smaller by one, two, or more than the number of through-holes 40 in a case where the through-holes 40 are formed at an equal interval in the entire circumferential direction of the yoke portion 36.

The reason for reducing the through-holes 40 is as follows. That is, in order to ensure adhesion between the electromagnetic steel sheets for the purpose of ensuring rigidity of the stator 34 (stator core 35), the stator 34 (stator core 35) may be fixed to the housing body 10A by using a large number of bolts 20. On the other hand, a magnetic force line of a magnetic field generated by an energized coil passes through the yoke portion 36 in which the through-hole 40 for the bolt 20 is formed. However, the through-hole 40 blocks the magnetic force line. Consequently, the presence of the through-hole 40 weakens a magnetic force generated in the stator 34. Therefore, it is preferable that the number of through-holes 40 is as small as possible. In view of a balanced configuration, the number of through-holes 40 is reduced.

As described above, a predetermined arc length (first arc length L1 or second arc length L2) is set between the through-holes 40 adjacent to each other.

The second arc length L2 is set longer than the first arc length L1. In other words, an angle (θ2 in FIG. 2) formed by each center of the adjacent through-holes 40 where the second arc length L2 is set and the rotational axis X1 is larger than an angle (θ1 in FIG. 2) formed by each center of the adjacent through-holes 40 in which the first arc length L1 is set and the rotational axis X1.

In this manner, the number of through-holes 40 can be reduced by one, two, or more, compared to a case where the through-holes 40 are formed at an equal interval in the entire circumferential direction (for example, a case where the first arc length L1 is set over the entire periphery).

In this case, in order to evenly provide the bolts 20 (through-holes 40), it is preferable that the first arc length L1 and the second arc length L2 are alternately set. In other words, it is preferable that 360° is divided by θ1 and θ2 which are alternately set.

In addition, it is preferable that the through-hole 40 is formed in the yoke portion 36 located on a base end side of the bridge portion 38. This configuration aims to suppress a blockage of the magnetic force line as much as possible by providing the through-hole 40 in the yoke portion 36 on the base end side of the bridge portion 38 having a relatively large area. Therefore, it is preferable to set θ2=θ1×2n (n is a natural number) so that an angle formed by the adjacent bridge portions 38 and the rotational axis X1 (40° in the case of FIGS. 2) and θ1 are equal angles.

In the case of FIG. 2, the six through-holes 40 are formed for the nine bridge portions 38, and all of the through-holes 40 are located on the base end side of the bridge portion 38. In this case, θ1=40° and θ2=80° are set.

Here, the stator core 35 is subjected to the varnish treatment, and the rigidity of the stator 34 (stator core 35) is improved by increasing the adhesion between the plurality of laminated electromagnetic steel sheets.

In this case, the varnish treatment may be performed on at least a portion of a section where the second arc length L2 is set (preferably, near the center of the section where the second arc length L2 is set). For example, the varnish treatment may be performed on the stator core 35 in a portion shaded in FIG. 2.

The reason for partially performing the varnish treatment is as follows. That is, in the section where the second arc length L2 is set, there is a possibility that tightening of the bolt 20 does not sufficiently work, compared to the section where the first arc length L1 is set. Therefore, in the section, the adhesion between the electromagnetic steel sheets cannot be sufficiently ensured, thereby possibly causing the rigidity to decrease, and noise of the electric motor 30 to be generated due to vibrations of the stator core 35. Therefore, the varnish treatment is performed on at least a portion of the section (section where the second arc length L2 is set) where there is a possibility that the adhesion may decrease. In this manner, the adhesion in the section is increased.

That is, the varnish treatment is performed on at least the section where the adhesion cannot be obtained by the bolt 20. In this manner, the adhesion between the electromagnetic steel sheets is ensured without using the bolt 20 while the magnetic force line is prevented from being blocked by the through-hole 40.

In addition, a cutout 42 may be formed in an outer peripheral end of the yoke portion 36 in the section subjected to the varnish treatment.

When the stator 34 of the electric motor 30 is housed in the electric motor housing space S1, the cutout 42 generates a gap between an inner wall of the housing body 10A forming the electric motor housing space S1 and the stator core 35. This gap functions as a refrigerant flow path through which a refrigerant flows.

The varnish treatment may be performed not only on the above-described section but also on the entire section of the stator 34.

The present embodiment achieves the following advantageous effects.

In the through-hole 40 into which the bolt 20 is inserted, as the arc length between the through-holes 40 adjacent to each other, the first arc length L1 or the second arc length L2 longer than the first arc length L1 is set. In this manner, the number of through-holes 40 can be reduced, compared to a case where the plurality of through-holes 40 are formed by setting the arc length between all of the through-holes 40 as the first arc length L1. In addition, in the stator core 35, the varnish treatment is performed on at least a region near the center in the circumferential direction between the through-holes 40 where the second arc length L2 is set. In this manner, rigidity can be ensured by increasing adhesion between the electromagnetic steel sheets laminated in the region.

Therefore, it is possible to reduce a probability that the magnetic force line may be blocked more than necessary by the through-hole 40, or that the number of components and the number of times for processing may increase. At the same time, the varnish treatment is performed on the stator core 35 in at least the region where the number of through-holes 40 is reduced (near the center of the second arc length L2). In this manner, the rigidity of the stator core 35 can be ensured without performing tightening of the bolt 20 by increasing the adhesion between the electromagnetic steel sheets laminated in the region. In addition, since the rigidity is ensured, noise of the electric motor 30 which is caused by vibrations of the stator core 35 can be suppressed.

In addition, the cutout 42 is formed on the outer peripheral side of the yoke portion 36 subjected to the varnish treatment. According to this aspect, a refrigerant flow path can be formed by utilizing the region subjected to the varnish treatment.

In the electric compressor 1 which is preferably miniaturized, the cutout may be formed in the stator core 35 to form the refrigerant flow path inside the housing body 10A. However, the cutout 42 is formed in a region where the rigidity is improved through the varnish treatment. In this manner, a decrease in the rigidity of the whole stator core 35 can be suppressed as much as possible while the cutout 42 is formed.

REFERENCE SIGNS LIST

1: electric compressor
10: housing
10A: housing body
10B: front case
14: scroll compression mechanism
14A: orbiting scroll
14B: fixed scroll
16: drive shaft
18: crank pin
20: bolt
22: main bearing
24: sub bearing
30: electric motor
32: rotor
34: stator
35: stator core
36: yoke portion
38: bridge portion
40: through-hole
42: cutout
L1: first arc length
L2: second arc length
S1: electric motor housing space
S2: compression mechanism housing space
X1: Rotational axis
X2: central axis

The invention claimed is:

1. An electric compressor comprising:
an electric motor having a stator and a rotor;
a drive shaft fixed to the rotor, and rotating around an axis by the electric motor;
a compression mechanism provided on one end side of the drive shaft, and driven by the drive shaft; and
a housing that houses the electric motor, the drive shaft, and the compression mechanism,
wherein the stator has a stator core formed such that a plurality of electromagnetic steel sheets having a substantially annular shape are laminated in a direction of the axis when viewed in the direction of the axis,
in the stator core, a plurality of through-holes penetrating in a lamination direction of the electromagnetic steel sheets are formed,
when viewed in the direction of the axis, a center of each of the plurality of through-holes passes through a circle around the axis,
when viewed in the direction of the axis, arc lengths between the through-holes adjacent to each other in a circumferential direction of the circle are set, such that a second arc length is longer than the first arc length,
the stator is fixed to the housing by a bolt inserted into the through-hole, and
the stator core is subjected to varnish treatment only in a region near a center in the circumferential direction between the through-holes where the second arc length is set.

2. The electric compressor according to claim 1,
wherein when viewed in the direction of the axis, the stator core has a yoke portion having a substantially annular shape, and
a plurality of bridge portions extending inward in a radial direction from an inner peripheral end of the yoke portion, and formed in each of the first arc lengths in the circumferential direction.

3. The electric compressor according to claim 2,
wherein the through-hole is formed in the yoke portion located on a base end side of the bridge portion, and
a cutout is formed on an outer periphery of the yoke portion between the through-holes where the second arc length is set.

4. The electric compressor according to claim 3,
wherein the first arc length and the second arc length are alternately set in the circumferential direction.

5. The electric compressor according to claim 1,
wherein the first arc length and the second arc length are alternately set in the circumferential direction.

6. The electric compressor according to claim 2,
wherein the first arc length and the second arc length are alternately set in the circumferential direction.

* * * * *